United States Patent
Sedlov et al.

(10) Patent No.: US 10,851,668 B2
(45) Date of Patent: Dec. 1, 2020

(54) COOLED WALL OF A TURBINE COMPONENT AND A METHOD FOR COOLING THIS WALL

(71) Applicant: ANSALDO ENERGIA SWITZERLAND AG, Baden (CH)

(72) Inventors: Andrey Sedlov, Moscow (RU); Maxim Plodistyy, Balashikha (RU); Oleg Naryzhny, Moscow (RU)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 629 days.

(21) Appl. No.: 15/415,413

(22) Filed: Jan. 25, 2017

(65) Prior Publication Data

US 2017/0211418 A1 Jul. 27, 2017

(30) Foreign Application Priority Data

Jan. 25, 2016 (RU) .................. 2016102180

(51) Int. Cl.
*F01D 25/14* (2006.01)
*F01D 25/12* (2006.01)
(Continued)

(52) U.S. Cl.
CPC ............. *F01D 25/14* (2013.01); *F01D 5/187* (2013.01); *F01D 9/041* (2013.01); *F01D 25/12* (2013.01);
(Continued)

(58) Field of Classification Search
CPC ...... F28F 13/06; F28F 3/02; F28F 3/12; F28F 7/02; F02C 7/12; F23R 3/002;
(Continued)

(56) References Cited

U.S. PATENT DOCUMENTS 3,767,322 A 10/1973 Durgin et al.
4,297,077 A 10/1981 Durgin et al.
(Continued)

FOREIGN PATENT DOCUMENTS

CN 102393144 A 3/2012
CN 104564350 A 4/2015
(Continued)

OTHER PUBLICATIONS

The extended European Search Report dated Jun. 30, 2017, by the European Patent Office in corresponding European Application No. 17153155.1. (7 pages).
(Continued)

*Primary Examiner* — Travis C Ruby
(74) *Attorney, Agent, or Firm* — Buchanan Ingersoll & Rooney PC

(57) ABSTRACT

A cooled wall of a turbine component includes a first layer of channels for a coolant arranged along a side of the wall facing to a flow of hot gas, the first layer of channels having a serpentine shape, each channel of the first layer having an inlet and an outlet; a second layer of channels for the coolant disposed further from the flow of hot gas than the first layer, each channel of the second layer having an inlet and an outlet, the outlet of each of the channels of the first layer being in fluid communication with corresponding inlet of associated channel of the second layer creating a bend for changing a direction of the coolant leaving the channel of the first layer when entering the channel of the second layer.

13 Claims, 3 Drawing Sheets

(51) Int. Cl.
  *F01D 5/18* (2006.01)
  *F01D 9/04* (2006.01)
  *F02C 7/12* (2006.01)
  *F23R 3/00* (2006.01)

(52) U.S. Cl.
  CPC .............. *F02C 7/12* (2013.01); *F23R 3/002* (2013.01); *F05D 2250/185* (2013.01); *F05D 2260/20* (2013.01); *F05D 2260/204* (2013.01); *F23R 2900/03043* (2013.01)

(58) Field of Classification Search
  CPC ..... F23R 2900/03043; F05D 2260/221; F05D 2250/185; F05D 2260/20; F05D 2260/204; F01D 25/14; F01D 25/12; F01D 5/187; F01D 9/041
  USPC ........................................ 165/166, 168, 170
  See application file for complete search history.

(56) References Cited

U.S. PATENT DOCUMENTS

| | | | | |
|---|---|---|---|---|
| 4,302,940 A | * | 12/1981 | Meginnis | F23R 3/002 416/231 A |
| 4,312,186 A | * | 1/1982 | Reider | F23R 3/002 60/754 |
| 4,835,958 A | * | 6/1989 | Rice | F01D 5/185 415/114 |
| 5,215,431 A | | 6/1993 | Derrien | |
| 5,328,331 A | | 7/1994 | Bunker et al. | |
| 5,363,654 A | * | 11/1994 | Lee | F23R 3/002 165/908 |
| 5,374,161 A | * | 12/1994 | Kelch | F01D 11/005 277/641 |
| 5,375,973 A | * | 12/1994 | Sloop | F01D 11/08 415/115 |
| 5,538,393 A | * | 7/1996 | Thompson | F01D 11/08 415/115 |
| 5,737,922 A | * | 4/1998 | Schoenman | F23R 3/002 60/752 |
| 5,933,699 A | * | 8/1999 | Ritter | B23P 15/00 419/28 |
| 5,975,850 A | * | 11/1999 | Abuaf | F01D 5/187 415/115 |
| 5,993,156 A | | 11/1999 | Bailly et al. | |
| 6,282,905 B1 | * | 9/2001 | Sato | F23R 3/002 60/752 |
| 6,761,031 B2 | * | 7/2004 | Bunker | F23M 5/085 60/39.37 |
| 7,118,326 B2 | | 10/2006 | Liang | |
| 7,497,655 B1 | | 3/2009 | Liang | |
| 7,563,072 B1 | | 7/2009 | Liang | |
| 7,740,161 B2 | * | 6/2010 | Boman | F02K 9/64 228/101 |
| 8,414,263 B1 | | 4/2013 | Liang | |
| 8,444,386 B1 | * | 5/2013 | Liang | F01D 5/186 416/92 |
| 8,608,430 B1 | | 12/2013 | Liang | |
| 8,727,704 B2 | * | 5/2014 | Lee | F01D 11/08 415/116 |
| 9,822,654 B2 | | 11/2017 | Brandl et al. | |
| 2002/0018715 A1 | * | 2/2002 | Dailey | F01D 5/18 416/1 |
| 2004/0050059 A1 | * | 3/2004 | Bunker | F23M 5/085 60/752 |
| 2004/0146399 A1 | * | 7/2004 | Bolms | F01D 25/12 415/175 |
| 2005/0051313 A1 | * | 3/2005 | Grosser | F28F 3/12 165/170 |
| 2005/0058534 A1 | * | 3/2005 | Lee | F01D 5/288 415/116 |
| 2007/0029369 A1 | * | 2/2007 | Watkins | B23K 20/021 228/183 |
| 2007/0053809 A1 | * | 3/2007 | Brenner | B01F 5/061 422/225 |
| 2008/0267845 A1 | * | 10/2008 | Hoglund | F28F 3/02 422/224 |
| 2010/0037620 A1 | | 2/2010 | Chila | |
| 2010/0236245 A1 | * | 9/2010 | Johnson | F23R 3/002 60/725 |
| 2010/0314088 A1 | * | 12/2010 | Yoo | F28D 9/0062 165/170 |
| 2011/0008177 A1 | | 1/2011 | Anguisola McFeat et al. | |
| 2011/0088600 A1 | * | 4/2011 | MacRae | F27D 9/00 110/182.5 |
| 2011/0255989 A1 | * | 10/2011 | Koyabu | F01D 11/24 416/97 R |
| 2013/0243575 A1 | * | 9/2013 | Zelesky | F01D 5/186 415/116 |
| 2013/0248167 A1 | * | 9/2013 | Lerou | F28D 15/02 165/287 |
| 2014/0060060 A1 | * | 3/2014 | Bernero | F23R 3/12 60/748 |
| 2014/0150436 A1 | * | 6/2014 | Eroglu | F01D 25/12 60/752 |
| 2014/0238642 A1 | * | 8/2014 | Brand | F28D 15/00 165/80.4 |
| 2015/0110612 A1 | * | 4/2015 | Brandl | F01D 9/065 415/178 |
| 2016/0281986 A1 | * | 9/2016 | Chang | F23R 3/06 |

FOREIGN PATENT DOCUMENTS

| | | |
|---|---|---|
| EP | 2 256 297 B1 | 5/2012 |
| EP | 2966395 A1 | 1/2016 |
| JP | 11190204 A  * | 7/1999 |

OTHER PUBLICATIONS

First Office Action dated Jul. 27, 2020, by the Chinese Patent Office in corresponding Chinese Patent Application No. 201710275549.5, and an English Translation of the Office Action. (17 pages).

* cited by examiner

COOLED WALL OF A TURBINE COMPONENT AND A METHOD FOR COOLING THIS WALL

PRIORITY CLAIM

This application claims priority from Russian Patent Application No. 2016102180 filed on Jan. 25, 2016, the disclosure of which is incorporated by reference.

TECHNICAL FIELD

The present invention relates to the cooled wall of a turbine component.

BACKGROUND ART

General tasks of heavy-duty gas turbine engine development are the increase of efficiency, power output and lifetime of components of turbine. The state-of-art temperature hot gas level at the turbine inlet section is 1800-1900 K that is far above of the limit of thermal stability of the turbine materials and only a use of highly sophisticated cooling systems allows to reach required lifetime with reasonable coolant consumption. However introduction of cooling systems inevitably provides temperature gradients across the cooled walls and as the results thermal stresses that is why the task of the cooling systems is to provide both minimum temperature and temperature nonuniformity levels for acceptable lifetime.

Such components of the gas turbine as Combustor liners and first stage vanes are subjected by the most severe thermal conditions due to highest inlet temperature level (that can be much higher than mass-average due to nonuniform burning conditions) and turbulence level generated in the combustion chamber.

As a result, very common practice for state-of-art cooling of vanes and combustor components is to use extensive impingement cooling with following coolant discharge to the flowpath through film cooling rows.

Further development of gas turbine engines is focused on the raise of cyclic parameters: pressure ratio and hot gas temperature that in its turn will lead to worsening of thermal boundary conditions for turbine and combustor components that stands a task for development of novel, highly effective cooling system to guarantee the reliable work within the prescribed service interval.

In the beginning of $1990^{th}$ the active development of high efficient near wall cooling schemes ( ) has been initiated. Numerous cooling schemes on the basis of wall integrated cooling features (impingement, pins, swirling or ribbed passages) with further discharge to the flowpath propose high cooling effectiveness and achievement of required temperature levels of outer side (hot gas washed) of wall. However such cooling schemes have a disadvantage, because inner side (coolant washed) of wall is completely surrounded by coolant and has very low temperature. Since both sides are integrated, such a big metal temperature difference provides high thermal stresses and limits the lifetime of the component. Therefore, special attention should be also paid to reduction of such temperature gradients across the cooled walls.

The majority of patented cooling schemes deals with mature manufacturing technologies (casting, machining, brazing) and conventional cooling features (impingement, pins and cylindrical holes). The wider spread scheme is a combination of impingement with film cooling: for instance EP 2256297 B1, U.S. Pat. Nos. 3,767,322 A, 4,297,077 A, 7,118,326 B2, 7,497,655 B1 (vanes) and US 20100037620 A1, U.S. Pat. No. 6,761,031 B2 (Liners). All these schemes are reliable and robust but are limited on the current cooling technology level and further increase of turbine inlet parameters needs more effective cooling schemes.

U.S. Pat. Nos. 8,608,430 B1, 8,414,263 B1, 5,215,431 A, propose near cooling concepts with wall integrated impingement features. Although given cooling schemes are quite cooling effective, but due to thick cold wall surrounded by cooling air, lifetime of such components is quite limited.

U.S. Pat. Nos. 5,993,156 A and 7,563,072 B1 demonstrates cooling systems with wall integrated pin field and spiral channels in mid-chord region. Although high heat transfer rates achieved in such cooling features can very effectively reduce hot gas washed part of the wall till required level, thick cold part of the wall would produce high thermal stresses and limit lifetime of the part.

U.S. Pat. No. 5,328,331 A represents a coolable airfoil provided with an integrally formed double shell cooling system where inner and outer shells are integrally formed with tying elements (pedestals, rods or ribs) which space apart the shells and mechanically and thermally tie the shells. This scheme represents quite a flexible system, but too simple convective cooling features are not feasible for state-of-art first stage components.

DISCLOSURE OF THE INVENTION

It is an object of the present invention to solve the aforementioned problems, namely to provide a reliably cooled wall.

The disclosure and exemplary embodiments can reduce temperature gradients across the cooled walls and as the results thermal stresses; provide both minimum temperature and temperature nonuniformity levels for acceptable lifetime, avoid using extensive impingement cooling with following coolant discharge to the flowpath through film cooling rows; avoid raising of cyclic parameters: pressure ratio and hot gas temperature that in its turn will lead to worsening of thermal boundary conditions for turbine and combustor components and, correspondingly, guarantee the reliable work within the prescribed service interval; avoid that the inner side (coolant washed) of the wall is completely surrounded by coolant and has very low temperature and avoid a big metal temperature difference provides high thermal stresses and limits the lifetime of the component and reduction of such temperature gradients across the cooled walls; avoid to increase of turbine inlet parameters needs more effective cooling schemes; avoid thick cold wall surrounded by cooling air and thick cold part of the wall.

The claimed device refers to novel cooling flow network by convective channels with a special target for improvement of the lifetime by reduction of temperature gradients across the sides of the wall. The major aspects of the present invention distinguishing it from other schemes are the following:

The use of internal cooling system built on the basis of double layered cooling scheme to effectively cool down outer side of the wall by the first layer of cooling channels and meanwhile heat up coolant washed surface through the second layer with "preheated" air from the first layer. This cooling flow organization allows to reduce temperature gradients across the sides of the wall and as the results thermal stresses and improve lifetime of the component The use of cylindrical cooling channels as a cooling features is beneficial from the lifetime point of view by removing sharp corners.

The use of serpentine flow organization with turns provides flow restructurization, swirling and increase of turbulence level to enhance heat transfer rates and provide the high efficient cooling of outer side till the required temperature levels.

The use of the proposed cooling scheme allows to effectively organize external cooling by the spent air that is "pre-cooled" in the second serpentine layer.

The proposed cooling scheme allows to arrange a very local optimization of cooling heat transfer rates (by varying the size of convective channels, turns dimensioning) in relation to external factors such as available pressure ratio and local film cooling effectiveness with a target to reach maximum uniformity of resulting metal temperatures and stresses in all locations, remove all critical zones and provide maximum lifetime and/or coolant savings.

Cooling segments (cooled walls) can be arranged as counter flowing in case of a request of maximum cooling uniformity effect. In case of significant change of hot gas exposure drivers, single flowing segments adjusted to a specific direction can be used.

Besides due to an arrangement of serpentine a better coverage of the component surface and cooling of the surface at practically all locations can be realized.

According to the present invention, there is provided a cooled wall of a turbine component comprising:

a first layer of channels for a coolant faced to a flow of hot gas, said first layer having serpentine shape, each channel of said first layer having an inlet and an outlet;

a second layer of channels for the coolant disposed further from the flow of hot gas than said first layer, each channel of said second layer having an inlet and an outlet, said outlet of each of said channels of said first layer being in fluid communication with corresponding inlet of associated channel of said second layer creating a bend for changing a direction of the coolant leaving said channel of said first layer when entering the channel of said second layer.

At least part of the channels of said second layer has serpentine shape.

At least part of the channels of said second layer has straight shape.

At least part of the inlets of channels of said first layer has a substantially 90° bend for supplying the coolant.

At least part of the outlets of channels of said second layer has a substantially 90° bend for discharge the coolant.

The bend created by the association of said outlet of each of said channels of said first layer with the corresponding inlet of the associated channel of said second layer is equal 180°.

The channels of first layer are adapted to pass a flow in counter-current manner with respect to the flow in the channels of the second layer.

The channels of the first layer are adapted so that the flow in one channel of the first layer flows in counter-current manner with respect to the flow in the other channel of the first layer.

The channels of the second layer are adapted so that the flow in one channel of the second layer flows in counter-current manner with respect to the flow in the other channel of the second layer.

Sides of the cooled wall cover said first layer and said second layer. Cooled wall has a rectangular shape. The first layer of channels and the second layer of channels are located inside the cooled wall.

The channels of the first layer and the channels of the second layer are located opposite to each other, wherein a channel of the first layer has a repeating pattern of curves along an axial extension of the channel and a channel of the second layer has a repeating pattern of curves along an axial extension of the channel, and wherein a channel of the first layer is displaced in a half pitch of the repeating pattern with respect to an associated channel of the second layer.

Besides according to the claimed invention it is provided a method for cooling the above mentioned wall according and reducing the thermal gradient in said wall comprising the steps of:

feeding a coolant into the first layer of channels;

cooling the wall by flowing the coolant through the first layer of channels;

discharging the coolant from the first layer of channels into the second layer of channels;

flowing the coolant through the second layer of channels for reducing the temperature gradient in the wall; and discharging the coolant from the second layer of channels.

The coolant can be supplied in the first layer of the channels and discharged from the second layer of channels at one side of the cooled wall.

The coolant can be supplied in the first layer of the channels and discharged from the second layer of channels at opposite sides of the cooled wall.

The flow in the channels of first layer is passed in counter-current manner with respect to the flow in the channels of the second layer.

It is possible to pass the flow in one channel of the first layer flows in counter-current manner with respect to the flow in the other channel of the first layer.

It is possible to pass the flow in such way that the flow in one channel of the second layer flows in counter-current manner with respect to the flow in the other channel of the second layer.

Besides according to the claimed invention, there is provided a vane of turbine comprising the above mentioned cooled wall.

Besides according to the claimed invention, there is provided a combustor liner comprising the above mentioned cooled wall.

The objects and aspects of the invention may be also seen from the following description of the invention.

First stage vanes and combustor liner are subjected by the most severe thermal conditions due to highest inlet temperature level (that can be much higher than mass-average due to nonuniform burning conditions) and turbulence level generated in the combustion chamber. Further development of gas turbine engines is focused on the raise of cyclic parameters: pressure ratio and hot gas temperature that in its turn will lead to worsening of thermal boundary conditions for turbine and combustor components that stands a task for development of novel, highly effective cooling system to guarantee the reliable work within the prescribed service interval. Actively developing near wall cooling schemes with integrated cooling features (impingement, pins, swirling or ribbed passages) are the breakthrough way to reduce outer side (hot gas washed) of the wall temperature of cooled components till the required level, however despite of very high cooling effectiveness, such schemes have limitations for lifetime, because of very low inner side (coolant washed) of the wall temperature (almost equals to coolant temperature) that causes high temperature gradients and thermal stresses.

The proposed scheme of cooling flow organization ensures required lifetime of aforementioned components. This scheme refers to novel cooling flow network by double layered convective channels to effectively cool down outer side of the wall by the first layer of cooling channels and meanwhile heat up inner side of the wall through the second layer with "pre-heated" air from the first layer. This cooling flow organization allows to reduce temperature gradients across the sides of the wall and as the results thermal stresses and significantly improve lifetime of the component or provide noticeable coolant savings targeting the same lifetime.

The proposed cooling scheme uses cylindrical cooling channels with serpentine flow organization with turns to produce high heat transfer enhancement and highly efficient cooling of hot gas washed surface till the required temperature levels. Further coolant can be directed to the other segment or convective cooling feature or discharged to the flowpath by means of film cooling (air is already "pre-cooled" in a second serpentine layer). The proposed scheme is quite robust, adjustable and is maximally beneficial by a manufacturing with a use of a highly accurate additive manufacturing method like Selective Laser Melting (SLM). The proposed cooling scheme has a wide area of applicability: aside of vane airfoils and combustor liners, this scheme can be also implemented for the cooling of first stage blade airfoils and vane platforms.

Advantage of the invention over the best existing solutions is Lifetime improvement (turbine blading, combustor liners) and/or coolant savings.

DETAILED DESCRIPTION

Figure 1:
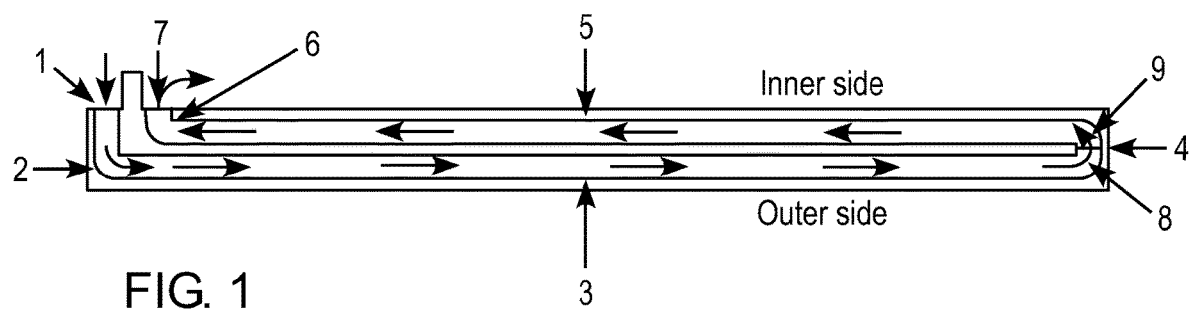
FIG. 1 shows a side view of the first embodiment of the invention and flow arrangement.
Figure 2:
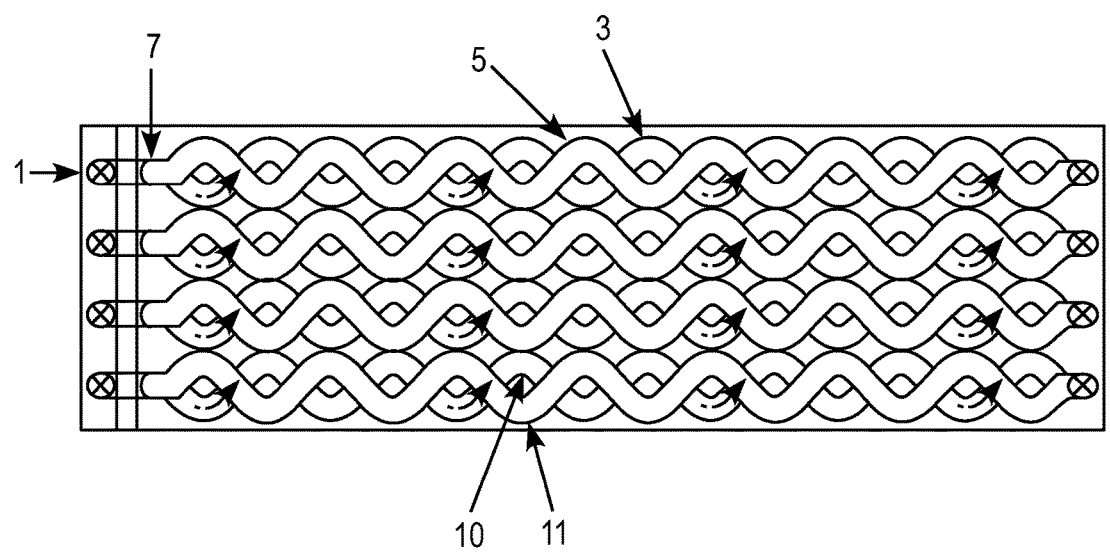
FIG. 2 shows a plan view of the first embodiment of the invention and flow arrangement.
Figure 3:
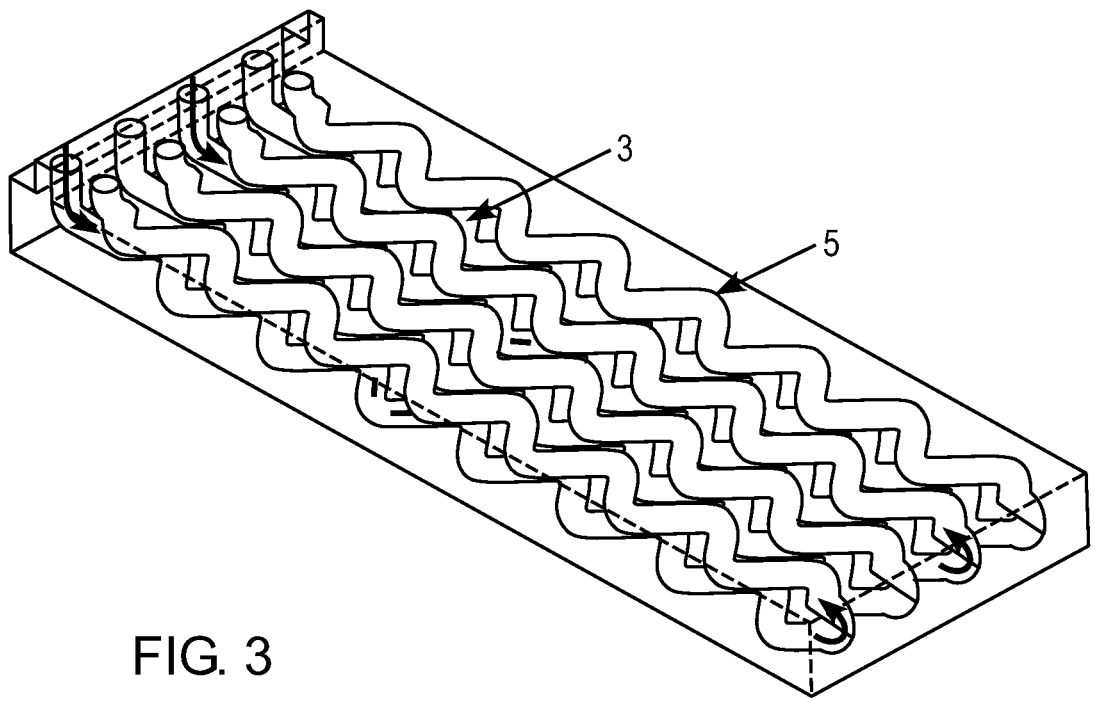
FIG. 3 shows a perspective view of the first embodiment of the invention and flow arrangement.

FIGS. 1, 2 and 3 show the first embodiment of the claimed invention, namely, a cooled wall of (a heat-exchange device for) a turbine component comprising a first layer 3 of serpentine cooling channels for a coolant, a second layer 5 of serpentine cooling channels for the coolant. The channels are tubes. Each channel of the first layer 3 of serpentine cooling channels comprises inlet 1 and outlet 8. Each channel of the second layer 5 of serpentine cooling channels comprises inlet 9 and outlet 7. Each channel of the first layer comprises first 90 degrees bend 2 located near the inlet 1 of each channel of the first layer. Each channel of the first layer comprises second 90 degrees bend located near the outlet 8 of each channel of the first layer and each channel of the second layer comprises third 90 degrees bend located near the inlet 9 of each channel of the second layer. The second 90 degrees bend and the third 90 degrees bend associate (connect) and form 180 degrees bend 4. Each channel of the second layer comprises fourth 90 degrees bend 6 located near the outlet 7 of each channel of the second layer. The channels of the both layers are implemented cylindrical from the improved lifetime point of view. The channels of the first layer 3 are located parallel with respect to each other. The channels of the second layer 5 are located parallel with respect to each other. The channels of the first layer 4 are parallel with respect to the channels of the second layer 5. The outlets 7 of the second layer are displaced from the inlets 1 of the first layer towards the 180 degrees bend 4. As it was mentioned above the channels of the both layers have the serpentine shape, i.e. they have a sinusoid shape as it shown in FIG. 2. Wherein the each sinusoid channel of the first layer are displaced in a half pitch (half step) with respect of the associated sinusoid channel of the second layer as it shown in FIG. 2. In other words the channels of the first layer 3 and the channels of the second layer 5 are located opposite to each other, wherein the serpentine shape of the channels of the first layer 3 defines a plurality of bends 10 in longitudinal direction of first layer 3 and the serpentine shape of the channels of the second layer 5 defines a plurality of bends 11 in longitudinal direction of the second layer 5 and each channel of the first layer 3 is displaced in a half pitch of sine curve (sinusoid) with respect of the associated channel 11 of the second layer, i.e. first serpentine cooling channels in a first layer and second serpentine cooling channels in a second layer above each other, and wherein the first and second serpentine are offset in the main extension of the serpentine such that a bend in one direction of a serpentine in the first serpentine is at a position of a bend in the opposite direction of the second serpentine. This feature also can be described in the following way the channels of the first layer and the channels of the second layer are located opposite to each other, wherein a channel of the first layer has repeating pattern of curves along an axial extension of the channel and a channel of the second layer has a repeating pattern of curves along an axial extension of the channel, and wherein a channel of the first layer is displaced in a half pitch of the repeating pattern with respect to an associated channel of the second layer. Alternatively this could be described that the first serpentine is mirrored image of the second serpentine along the main extension of the serpentines. Due to this arrangement of serpentine a better coverage of the component surface and cooling of the surface at practically all locations can be realized.

The first layer 3 is faced to an outer side (hot gas washed) of the wall of turbine component and the second layer is faced to an inner side (air washed) of the wall of the component. The cooled wall has a rectangular shape. The first layer of channels and the second layer of channels are located inside the cooled wall, i.e. the first layer of channels and the second layer of channels are covered by the sides of the cooled wall.

There is first elongated rectangular protrusion on the inner side of the cooled wall. Said first protrusion is located across the cooled wall and adjacent to a first end side thereof. The inlet 1 is located closer to said first end side of the cooled wall then the protrusion and the outlet 7 is located far from said first end side then the protrusion, i.e. the protrusion is located between the inlet 1 and outlet 7.

The coolant is supplied in the inlets 1 of the channels of the first layer. The coolant flows through the bend 2 and channels of the first layer 3. While flowing through the channels of the first layer the coolant cools the outer side (hot gas washed) of the wall of the component, and correspondingly, the coolant is heated during flowing through the channels of the first layer. Then the heated coolant flows through the bend 4 in the channels of the second layer 5 to heat the inner side (air washed) of the wall of the component with a target to reduce metal temperature gradient across the wall and spent coolant temperature, wherein a direction of the coolant is changed when the coolant leaves said channels of said first layer and enters the channels of said second layer. After that the coolant flows through fourth 90 degrees bend 6 of the outlet 7 of the channels of the second layer and the coolant is discharged from the outlet 7 of the channels of the second layer. Further the coolant can be directed to the other cooled wall or convective cooling feature or discharged to the flowpath by means of film cooling.

FIGS. 1, 2 and 3 show the first embodiment in which the flows in the channels of first layer pass in counter-current manner with respect to the flows in the channels of the second layer. The flows in the channels of the first layer pass co-current manner with respect to each other (parallel). The flows in the channels of the second layer pass co-current manner with respect to each other (parallel).

Figure 4:
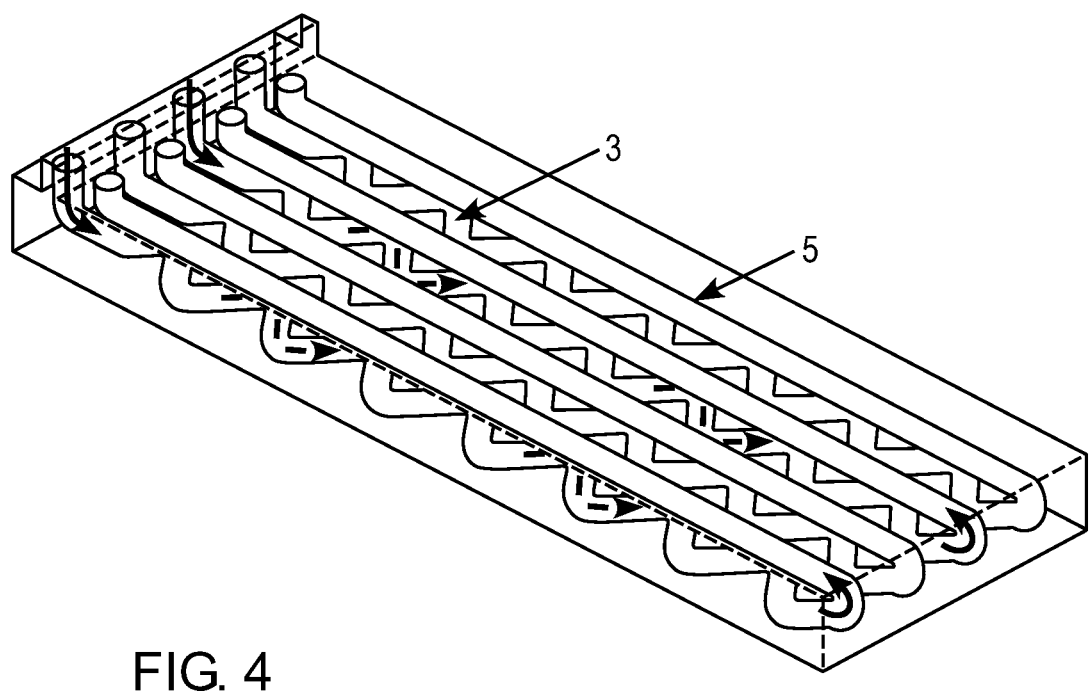
FIG. 4 shows a perspective view of the second embodiment of the invention and flow arrangement.

FIG. 4 shows the second embodiment of the invention in which the channels of the second layer 5 are straight. The other features of the second embodiment are the same as the above mentioned features of the first embodiment. In case of restricted available pressure ratio, the flow capacity of the cooling channel can be raised by implementation of straight section (second layer) 5 of second layer channel to reduce overall pressure losses in a cooling segment (see FIG. 4). However hot gas washed surface must be always cooled by serpentine cooling channels (first layer) 3 to keep high cooling heat transfer rates.

Figure 5:
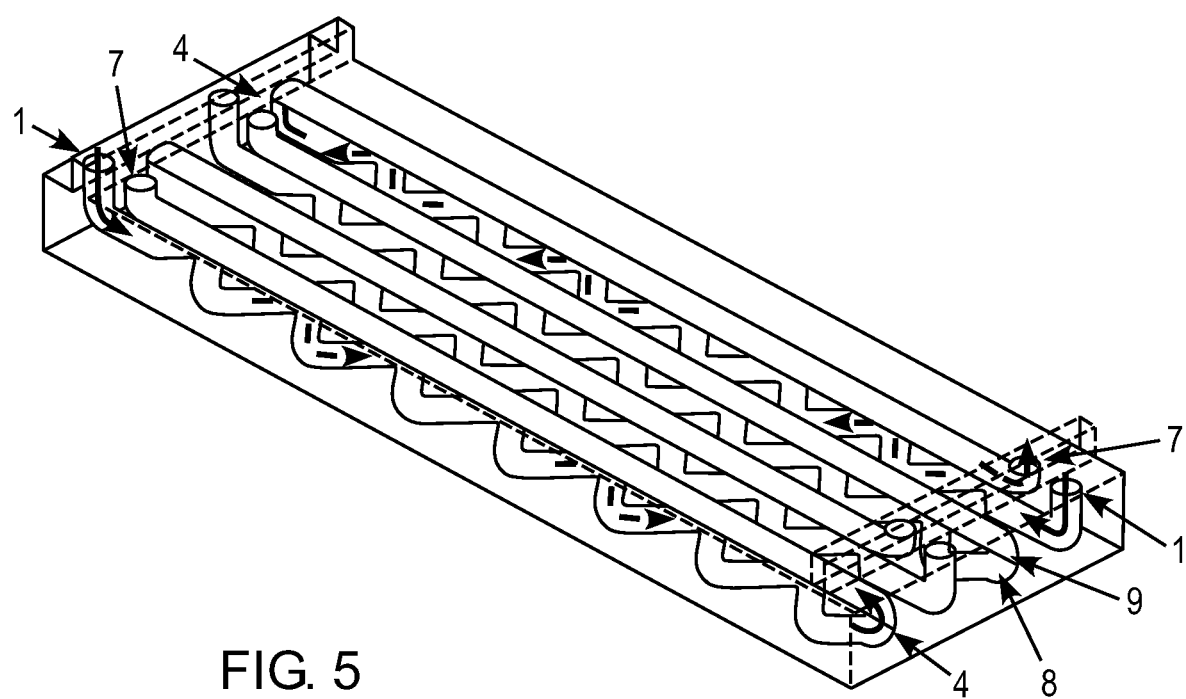
FIG. 5 shows a perspective view of the third embodiment of the invention and flow arrangement.

FIG. 5 shows a perspective view of the third embodiment of the invention in which the channels of the second layer 5 are straight. In this embodiment the channels of the first layer are adapted to pass flows in counter-current manner with respect to each other and the channels of the second layer are adapted to pass flows in counter-current manner with respect to each other, i.e. the flows in the channels of the first layer pass in counter-current manner with respect to each other and the flows in the channels of the second layer pass in counter-current manner with respect to each other. Besides the inlets and outlets of the channels of the second and first layers are alternated on the opposite end sides of the cooled wall, namely, on the first end side of the cooled wall the inlet 1 of one channel of the first layer and the outlet 7 of one channel of the second layer are alternated with the outlet 8 of other channel of the first layer and the inlet 9 of the other channel of the second layer and so on. In contrast, on the second end side of the cooled wall, which is opposite to the first end side, the outlet 8 of one channel of the first layer and the inlet 9 of one channel of the second layer are alternated with the inlet 1 of other channel of the first layer and the outlet 7 of the other channel of the second layer and so on. There is a second elongated rectangular protrusion on the inner side of the cooled wall. The second protrusion located adjacent to a second end side of the cooled wall, which is opposite to the first end side. The second protrusion is identical to the first protrusion. The other features of the second embodiment are the same as the above mentioned features of the first embodiment.

One more example of further optimization of the cooled wall is depicted in FIG. 5. Here the channels are directed counter-flow to each other to provide maximum uniformity of cooling exposure and therefore wall temperature.

The proposed cooled wall has a wide area of applicability: aside of vane airfoils and combustor liners, this scheme can be also implemented for the cooling of first stage blade airfoils and vane platforms. Parts could be manufactured by using of a highly accurate additive manufacturing method like Selective Laser Melting (SLM). Various basic cooled walls are arranged to cool midchord region (both pressure and suction sides) of a perspective first stage vane airfoil. Different serpentine channel lengths are adapted to the available pressure ratio depending on the coolant discharge location. The segments are directed counter-flow for maximally uniform cooling effect.

In view of the above mentioned the basic idea of the proposed cooling scheme is based on a combination of serpentine cooling channel in double layered implementation. Proposed idea of a typical cooling segment comprises seven features (see FIG. 1, 2). ("1") is a feeding inlet to cooling channel driving the coolant through the first 90 degrees bend ("2") towards first serpentine layer ("3") cooling outer side (hot gas washed) of the wall. After a certain cooling section (depending on the available pressure ratio), there is a 180 degrees bend ("4") to drive the "pre-heated" coolant into the second serpentine layer ("5") to arrange a heating of inner side (air washed) of the wall with a target to reduce metal temperature gradient across the wall and spent coolant temperature. "6" is the last 90 degrees bend to exhaust coolant out of the cooling segment "7". Further coolant can be directed to the other segment or convective cooling feature or discharged to the flowpath by means of film cooling. Both layers of cooling channels are implemented cylindrical from the improved lifetime point of view. Heat transfer enhancement in cooling channels is provided by their serpentine organization −90 degrees turns provide flow restructurization, swirling and increase of turbulence levels that allows to reach required heat transfer intensity levels to effectively cool down the outer side of the wall. Implementation of rounded edges on the turns allows to control pressure losses and heat transfer intensity levels to adjust the system according to available pressure ratio. FIG. 3 depicts isometric view on a basic cooling segment.

In case of restricted available pressure ratio, the flow capacity of cooling channel can be raised by implementation of straight section ("5") of second layer channel to reduce overall pressure losses in a cooling segment (see FIG. 4). However hot gas washed surface must be always cooled by serpentine cooling channels ("3") to keep high cooling heat transfer rates.

One more example of further optimization of the cooling segment is depicted in FIG. 5. Here the cooling serpentine channels are directed counter-flow to each other to provide maximum uniformity of cooling exposure and therefore wall temperature.

The invention claimed is:

1. A gas turbine comprising:
 a combustor liner including a wall configured to be cooled during an operation of the gas turbine, the wall including:
 a first layer of channels for a coolant arranged along a first side of the wall facing to a hot gas flow path, said channels of said first layer of channels having a serpentine shape with a repeating pattern of curves along an axial extension of the channel and, each channel of said first layer having an inlet and an outlet;
 a second layer of channels for the coolant arranged along a second side of the wall facing a coolant flow and opposite to the first side of the wall facing to the hot gas flow path, each channel of said second layer having an inlet and an outlet, said outlet of each of said channels of said first layer configured to be in fluid communication with a corresponding inlet of an associated channel of said second layer via a bend for changing a direction of coolant leaving said channel of said first layer when entering the channel of said second layer, said inlet of each of said channels of said first layer and said outlet of said channels of said second layer being open on said second face;

wherein a path of each channel of said first layer, when seen perpendicularly to the first side, crosses a path of the respective associated channel of said second layer in each repetition of said repeating pattern of curves.

2. The gas turbine according to claim 1, wherein at least part of the channels of said second layer has a serpentine shape.

3. The gas turbine according to claim 1, wherein at least part of the channels of said second layer has a straight shape.

4. The gas turbine according to claim 1, wherein at least part of the inlets of channels of said first layer has a substantially 90 degrees bend for supplying coolant.

5. The gas turbine according to claim 1, wherein at least part of the outlets of channels of said second layer has a substantially 90 degrees bend for discharge of coolant.

6. The gas turbine according to claim 1, wherein the bend is created by an association of said outlet of each of said channels of said first layer with the corresponding inlet of the associated channel of said second layer and is equal to 180 degrees.

7. The gas turbine according to claim 1, wherein the channels of first layer are configured to pass a flow in counter-current manner with respect to flow in the channels of the second layer.

8. The gas turbine according to claim 1, wherein the channels of the first layer are configured so that the flow in one channel of the first layer will flow in counter-current manner with respect to the flow in the other channel of the first layer.

9. The gas turbine according to claim 1, wherein the channels of the second layer are configured so that the flow in one channel of the second layer will flow in counter-current manner with respect to the flow in the other channel of the second layer.

10. The gas turbine according to claim 1, wherein sides of the liner wall cover said first layer and said second layer.

11. The gas turbine according to claim 1, wherein the channels of the first layer and the channels of the second layer are located opposite to each other in a direction orthogonal to a surface of the liner, wherein a channel of the second layer has a repeating pattern of curves along an axial extension of the channel, and wherein a channel of the first layer is displaced in a half pitch of the repeating pattern with respect to an associated channel of the second layer.

12. Method for cooling the gas turbine according to claim 1 and reducing a thermal gradient in said liner wall, the method comprising:

feeding a coolant into the first layer of channels;

cooling the liner wall by flowing the coolant through the first layer of channels;

discharging the coolant from the first layer of channels into the second layer of channels;

flowing the coolant through the second layer of channels for reducing the temperature gradient in the liner wall; and discharging the coolant from the second layer of channels.

13. A vane in combination with the gas turbine according to claim 1.

* * * * *